United States Patent
Cai et al.

(10) Patent No.: US 8,848,623 B2
(45) Date of Patent: Sep. 30, 2014

(54) SYSTEM AND METHOD FOR CHANNEL TIMING OFFSET

(75) Inventors: Zhijun Cai, Euless, TX (US); Sean McBeath, Keller, TX (US); Mo-Han Fong, Ottawa (CA); Mark Earnshaw, Kanata (CA); Youn Hyoung Heo, Kitchener (CA); Hua Xu, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 631 days.

(21) Appl. No.: 12/545,684

(22) Filed: Aug. 21, 2009

(65) Prior Publication Data

US 2011/0044261 A1 Feb. 24, 2011

(51) Int. Cl.
*H04W 4/00* (2009.01)
*H04W 72/04* (2009.01)
*H04L 5/00* (2006.01)

(52) U.S. Cl.
CPC ........... *H04W 72/042* (2013.01); *H04L 5/0053* (2013.01); *H04L 5/0055* (2013.01); *H04L 5/0091* (2013.01)
USPC .......................................... 370/329; 370/314

(58) Field of Classification Search
None
See application file for complete search history.

(56) References Cited

U.S. PATENT DOCUMENTS

| | | | |
|---|---|---|---|
| 7,298,833 B2 | 11/2007 | Klein et al. | |
| 8,305,998 B2 | 11/2012 | Marinier et al. | |
| 2003/0189909 A1 | 10/2003 | Chao et al. | |
| 2004/0125766 A1 | 7/2004 | Takano et al. | |
| 2005/0068990 A1* | 3/2005 | Liu | 370/516 |
| 2006/0072726 A1 | 4/2006 | Klein et al. | |
| 2006/0221894 A1 | 10/2006 | Casaccia et al. | |
| 2006/0285558 A1 | 12/2006 | Dottling et al. | |
| 2007/0121543 A1* | 5/2007 | Kuchibhotla et al. | 370/329 |
| 2007/0149228 A1 | 6/2007 | Das | |
| 2007/0174214 A1 | 7/2007 | Welsh et al. | |
| 2008/0108316 A1* | 5/2008 | Joung et al. | 455/226.1 |
| 2009/0016248 A1 | 1/2009 | Li et al. | |
| 2009/0034486 A1 | 2/2009 | Takahashi et al. | |

(Continued)

FOREIGN PATENT DOCUMENTS

| | | |
|---|---|---|
| EP | 1276279 | 1/2003 |
| EP | 08800743 | 2/2014 |

(Continued)

OTHER PUBLICATIONS

PCT International Search Report and Written Opinion, PCT/US2010/045895, Oct. 20, 2010.

(Continued)

*Primary Examiner* — Yemane Mesfin
*Assistant Examiner* — Samina Choudhry
(74) *Attorney, Agent, or Firm* — Fish & Richardson P.C.

(57) ABSTRACT

A method for receiving data using a user agent (UA) configured to communicate with a wireless communications network using a first and second communication carrier is presented. The method includes receiving control information during a first time interval. The control information allocates a resource on at least one of the first communication carrier and the second communication carrier. When the control information allocates a resource on the first communication carrier, the method includes receiving data using the first communication carrier during a second time interval. When the control information allocates a resource on the second communication carrier, the method includes receiving data using the second communication carrier during a third time interval, the third time interval being offset from the first time interval.

31 Claims, 10 Drawing Sheets

(56) References Cited

U.S. PATENT DOCUMENTS

| | | | |
|---|---|---|---|
| 2010/0110988 A1 | 5/2010 | Marinier | |
| 2010/0232373 A1* | 9/2010 | Nory et al. | 370/329 |
| 2010/0234037 A1 | 9/2010 | Terry et al. | |
| 2010/0303011 A1* | 12/2010 | Pan et al. | 370/328 |

FOREIGN PATENT DOCUMENTS

| | | |
|---|---|---|
| JP | 2008539667 | 11/2008 |
| JP | 2011517535 | 6/2011 |
| KR | 10-2004-036609 | 4/2004 |
| KR | 10-2009-0014114 | 2/2009 |
| WO | WO 2005055636 | 6/2005 |
| WO | WO 2007095966 | 8/2007 |
| WO | 2008115004 | 9/2008 |

OTHER PUBLICATIONS

Office Action issued in U.S. Appl. No. 12/545,698 on Nov. 2, 2011; 20 pages.
International Search Report and Written Opinion of the International Searching Authority issued in International Application No. PCT/US2010/045899 on Oct. 19, 2010; 8 pages.
Written Opinion of the International Preliminary Examining Authority issued in International Application No. PCT/US2010/045895 on May 30, 2012; 8 pages.
Written Opinion of the International Preliminary Examining Authority issued in International Application No. PCT/US2010/045899 on Jun. 5, 2012; 26 pages.
International Preliminary Report on Patentability issued in International Application No. PCT/US2010/04895 on Oct. 2, 2012; 9 pages.
Office Action issued in U.S. Appl. No. 12/545,698 on Feb. 14, 2012; 20 pages.
Office Action issued in U.S. Appl. No. 12/545,698 on Jun. 27, 2012; 18 pages.
Office Action issued in U.S. Appl. No. 12/545,698 on Dec. 5, 2012; 18 pages.
International Preliminary Report on Patentability issued in International Application No. PCT/US2010/45899 on Oct. 26, 2012; 8 pages.
Office Action issued in Korean Application No. 10-2012-7007246 on Aug. 20, 2013; 7 pages.
Office Action issued in Korean Application No. 10-2012-7007231 on Aug. 6, 2013; 7 pages.
Ericsson; "Carrier Aggregation in LTE-Advanced"; TSG-RAN WG1 #53bis (R1-082468); Warsaw, Poland; Jun. 30-Jul. 4, 2008; 6 pages.
ITRI; "Discussion of DRX in Carrier Aggregation"; 3GPP TSG-RAN WG2 #66bis (R2-093915); Jun. 29-Jul. 3, 2009; Los Angeles, United States; 4 pages.
Motorola; "DRX in LTE-A"; 3GPP TSG RAN2#66 bis (R2-093914); Los Angeles, United States; Jun. 29-Jul. 3, 2009; 3 pages.
Zte; "Downlink Control Structure for LTE-A"; 3GPP TSG-RAN WG1 Meeting #56 (R1-090628); Feb. 9-13, 2009; Athens, Greece; 5 pages.
Office Action issued in Japanese Application No. 2012-525666 on Jun. 19, 2013; 9 pages.
Office Action issued in Japanese Application No. 2012-525668 on Jun. 19, 2013; 6 pages.
Office Action issued in Canadian Application No. 2,771,765 on Oct. 23, 2013; 3 pages.
Office Action issued in U.S. Appl. No. 12/545,698 on Dec. 18, 2013; 18 pages.
Office Action issued in Canadian Application No. 2,771,762 on Jan. 6, 2014; 3 pages.
LG Electronics; "Cross Carrier Scheduling by PDCCH for Multiple Carrier Aggregation in LTE-Advanced"; 3GPP TSG RAN WG1 #58 (R1-093249); Aug. 24-28, 2009; Schenzhen, China; 5 pages.
Motorola; "Comparison of PDCCH Structures for Carrier Aggregation"; 3GPP TSG RAN1#56bis (R1-091326); Seoul, Korea; Mar. 23-27, 2009; 5 pages.
Office Action issued in Chinese Application No. 201080047484.5 on Jun. 5, 2014; 5 pages. No translation.
Office Action issued in Chinese Application No. 201080047489.8 on Jul. 2, 2014; 5 pages. No translation.

* cited by examiner

SYSTEM AND METHOD FOR CHANNEL TIMING OFFSET

BACKGROUND

The present invention relates generally to data transmission in mobile communication systems and more specifically to methods for establishing channel timing offset and carrier switching.

As used herein, the terms "user agent" and "UA" can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the term "access device" will refer to any component, such as a traditional base station or an LTE or LTE-A access device (including eNBs), that can provide a UA with access to other components in a telecommunications system.

In mobile communication systems such as E-UTRAN, an access device provides radio access to one or more UAs. The access device comprises a packet scheduler for dynamically scheduling downlink traffic data packet transmissions and allocating uplink traffic data packet transmission resources among all the UAs communicating with the access device. The functions of the scheduler include, among others, dividing the available air interface capacity between UAs, deciding the transport channel to be used for each UA's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UAs through a control channel.

Several different data control information (DCI) message formats are used to communicate resource assignments to UAs including, among others, a DCI format 0 for specifying uplink resources, DCI formats 1, 1A, 1B, 1C, 1D, 2 and 2A for specifying downlink resources, and DCI formats 3 and 3A for specifying power control information. Uplink specifying DCI format 0 includes several DCI fields, each of which includes information for specifying a different aspect of allocated uplink resources. Exemplary DCI format 0 DCI fields include a transmit power control (TPC) field, a cyclic shift demodulation reference signal (DM-RS) field, a modulating coding scheme (MCS) and redundancy version field, a New Data Indicator (NDI) field, a resource block assignment field and a hopping flag field. The downlink specifying DCI formats 1, 1A, 2 and 2A each include several DCI fields that include information for specifying different aspects of allocated downlink resources. Exemplary DCI formats 1, 1A, 2 and 2A DCI fields include a Hybrid Automatic Repeat reQuest (HARQ) process number field, an MCS field, a New Data Indicator (NDI) field, a resource block assignment field and a redundancy version field. Each of the DCI formats 0, 1, 2, 1A and 2A includes additional fields for specifying allocated resources. Other downlink formats 1B, 1C and 1D include similar information. The access device selects one of the downlink DCI formats for allocating resources to a UA as a function of several factors including UA and access device capabilities, the amount of data a UA has to transmit, the amount of communication traffic within a cell, etc.

LTE transmissions are divided into separate 1 millisecond sub-frames. DCI messages are synchronized with sub-frames so that they can be associated therewith implicitly as opposed to explicitly, which reduces control overhead requirements. For instance, in LTE frequency division duplex (FDD) systems, a DCI 0 message is associated with an uplink sub-frame four milliseconds later so that, for example, when a DCI 0 message is received at a first time, the UA is programmed to use the resource grant indicated therein to transmit a data packet in the sub-frame four milliseconds after the first time. Alternatively, a DCI message may be associated with a simultaneously transmitted downlink sub-frame. For example, when a DCI 1, 1A, 2, 2A, etc, message is received at a first time, the UA is programmed to use the resource grant indicated therein to decode a data packet in a simultaneously received traffic data sub-frame.

During operation, LTE networks use a shared Physical Downlink Control CHannel (PDCCH) to distribute assignment messages including DCI messages amongst UAs. The DCI messages for each UA as well as other shared control information may be separately encoded. The PDCCH includes a plurality of control channel elements (CCEs) that are used to transmit DCI messages from an access device to UAs. An access device selects one or an aggregation of CCEs to be used to transmit a DCI message to a UA, the CCE subset selected to transmit a message depends at least in part on perceived communication conditions between the access device and the UA.

In many cases it is desirable for an access device to transmit a large amount of data to a UA or for a UA to transmit large amounts of data to an access device in a short amount of time. For example, a series of pictures may have to be transmitted to an access device over a short amount of time. As another instance, a UA may run several applications that all have to receive data packets from an access device essentially simultaneously so that the combined data transfer is extremely large. One way to increase the rate of data transmission is to use multiple carriers (i.e., multiple frequencies) to communicate between an access device and the UAs. For example, a system may support five different carriers (i.e. frequencies) and eight HARQ processes per carrier so that 5×8=40 separate uplink and 5×8=40 separate downlink transmission streams can be generated in parallel. Communication via multiple carriers is referred to as carrier aggregation.

When implementing carrier aggregation, in conventional network implementations, the UA is configured to receive the PDSCH on each of the carriers being aggregated. Because the PDCCH and PDSCH occur in the same subframe for downlink communications, the UA is generally required to buffer the PDSCH on each of the configured carriers prior to determining whether the UA is granted a resource on any of the aggregated carriers. While this is consistent with various network timing protocols, the buffer requirements cause additional power consumption at the UA increasing processing and storage requirements and reducing battery life.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
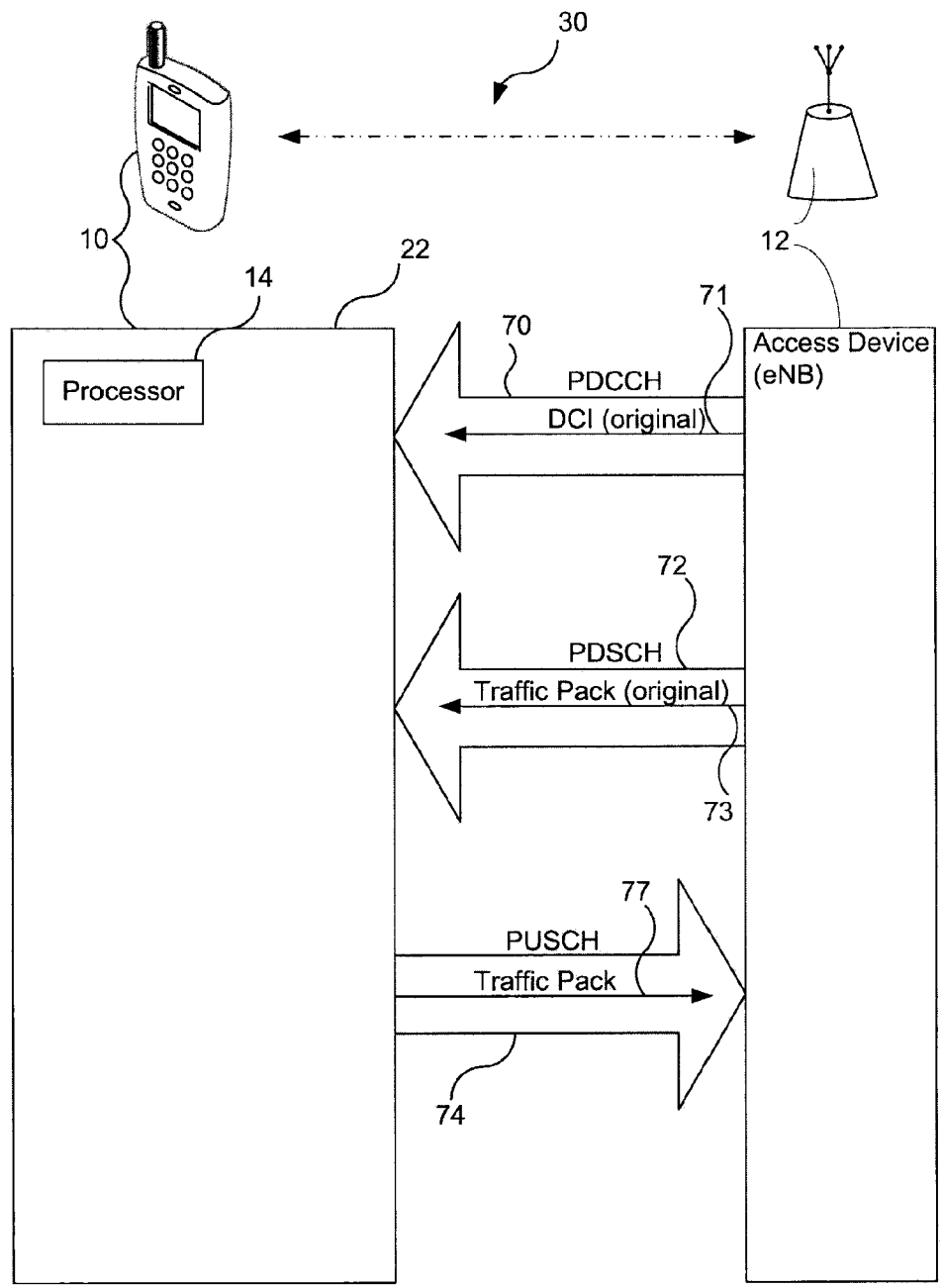
FIG. 1 is a schematic diagram illustrating an exemplary multi-channel communication system including a user agent (UA) and an access device.

Channel timing offsets and designated carrier switching may reduce the buffering requirements battery power consumption of a user agent (UA) operating on a wireless communications network implementing carrier aggregation.

To this end, some embodiments include a method for receiving data using a user agent (UA) configured to communicate with a wireless communications network using a first and second communication carrier. The method includes receiving control information during a first time interval. The control information allocates a resource on at least one of the first communication carrier and the second communication carrier. When the control information allocates a resource on the first communication carrier, the method includes receiving data using the first communication carrier during a second time interval. When the control information allocates a resource on the second communication carrier, the method includes receiving data using the second communication carrier during a third time interval, the third time interval being offset from the first time interval.

Other embodiments include a user agent (UA) configured to communicate with a wireless communications network using a first and second communication carrier. The UA includes a processor. The processor is configured to receive control information during a first time interval. The control information allocates a resource on at least one of the first communication carrier and the second communication carrier. When the control information allocates a resource on the first communication carrier, the processor is configured to receive data using the first communication carrier during a second time interval. When the control information allocates a resource on the second communication carrier, the processor is configured to receive data using the second communication carrier during a third time interval, the third time interval being offset from the first time interval.

Other embodiments include a wireless communications system for allocating resources on at least one of a first and second communication carrier of the wireless communications system to a user agent (UA). The system includes a base station. The base station is configured to transmit control information during a first time interval using a control channel of the base station. The control information allocates a resource on at least one of the first communication carrier and the second communication carrier. When the control information allocates a resource on the first communication carrier, the base station is configured to transmit data using the first communication carrier during a second time interval. When the control information allocates a resource on the second communication carrier, the base station is configured to transmit data using the second communication carrier during a third time interval, the third time interval being offset from the first time interval.

Other embodiments include a wireless communications system for allocating resources on at least one of a first and second communication carrier of the wireless communications system to a user agent (UA). The system includes a first base station providing the first communication carrier. The first base station is configured to transmit control information during a first time interval using a control channel of the first base station. The control information allocates a resource on at least one of the first communication carrier and the second communication carrier. When the control information allocates a resource on the first communication carrier, the first base station is configured to transmit data using the first communication carrier during the first time interval. The system includes a second base station providing the second communication carrier. The second base station is configured to, when the control information allocates a resource on the second communication carrier, transmit data using the second communication carrier during a second time interval, the second time interval being offset from the first time interval.

Other embodiments include a method for receiving data using a user agent (UA) configured to communicate with a wireless communications network using a first and second communication carrier. The method includes receiving control information at a first time interval using the first communication carrier. The control information allocates a resource on at least one of the first communication carrier and the second communication carrier. The control information indicates whether a carrier switch is required.

Other embodiments include a user agent (UA) configured to communicate with a wireless communications network using a first and second communication carrier. The UA includes a processor. The processor is configured to receive control information at a first time interval using the first communication carrier. The control information allocates a resource on at least one of the first communication carrier and the second communication carrier. The control information indicates whether a carrier switch is required.

Other embodiments include a wireless communications system for allocating resources on at least one of a first and second communication carrier of the wireless communications system to a user agent (UA). The wireless communications system includes a base station. The base station is configured to transmit control information at a first time interval using the first communication carrier. The control information allocates a resource on at least one of the first communication carrier and the second communication carrier. The control information indicates whether a carrier switch is required To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views, FIG. 1 is a schematic diagram illustrating an exemplary multi-channel communication system 30 including a UA 10 and an access device 12. UA 10 includes, among other components, a processor 14 that runs one or more software programs wherein at least one of the programs communicates with access device 12 to receive data from, and to provide data to, access device 12. When data is transmitted from UA 10 to device 12, the data is referred to as uplink data and when data is transmitted from access device 12 to UA 10, the data is referred to as downlink data. Access device 12, in one implementation, may include an E-UTRAN node B (eNB) or other network component for communicating with UA 10.

To facilitate communications, a plurality of different communication channels are established between access device 12 and UA 10. For the purposes of the present disclosure, referring to FIG. 1, the important channels between access device 12 and UA 10 may include a Physical Downlink Control CHannel (PDCCH) 70, a Physical Downlink Shared CHannel (PDSCH) 72 and a Physical Uplink Shared CHannel (PUSCH) 74. As the label implies, the PDCCH is a channel that allows access device 12 to control UA 10 during uplink/downlink data communications. To this end, the PDCCH can be used to transmit scheduling or control data packets referred to as downlink control information (DCI) packets to the UA 10 to indicate scheduling to be used by UA 10 to receive downlink communication traffic packets or transmit uplink communication traffic packets or to indicate specific instructions to the UA (e.g. power control commands, an order to perform a random access procedure, a semi-persistent scheduling activation or deactivation). A separate DCI packet may be transmitted by access device 12 to UA 10 for each traffic packet/sub-frame transmission. Exemplary DCI packets are indicated by communication 71 on PDCCH 70 in FIG. 1. Exemplary traffic data packets or sub-frames on PDSCH 72 are labeled 73. The PUSCH 74 is used by UA 10 to transmit data sub-frames or packets to access device 12. Exemplary traffic packets on PUSCH 74 are labeled 77.

Figure 2:
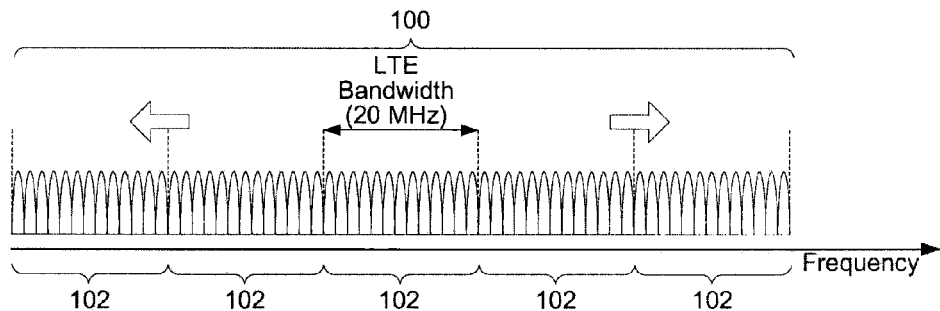
FIG. 2 is an illustration of carrier aggregation in a communications network where each component carrier has a bandwidth of 20 MHz and the total system bandwidth is 100 MHz.

Carrier aggregation may be used to support wider transmission bandwidths and increase the potential peak data rate for communications between UA 10, access device 12 and/or other network components. In carrier aggregation, multiple component carriers are aggregated and may be allocated in a sub-frame to a UA 10 as shown in FIG. 2. FIG. 2 is an example illustration of carrier aggregation in a communications network where each component carrier has a bandwidth of 20 MHz and the total system bandwidth is 100 MHz. As illustrated, the available bandwidth 100 is split into a plurality of carriers 102. UA 10 may receive or transmit on multiple component carriers (up to a total of five carriers 102 in the example shown in FIG. 2), depending on the UA's capabilities. Carrier aggregation may occur with carriers 102 located in the same band and/or carriers 102 located in different bands. For example, one carrier 102 may be located at 2 GHz and a second aggregated carrier 102 may be located at 800 MHz.

Each communication channel of each carrier may be separated into a number of subframes. For example, each channel may broadcast radio frames that are 10 milliseconds (ms) long, and consist of 10 subframes, each subframe being 1 ms long. Every sub frame may further include 2 slots where each slot is 0.5 ms.

Figure 3:
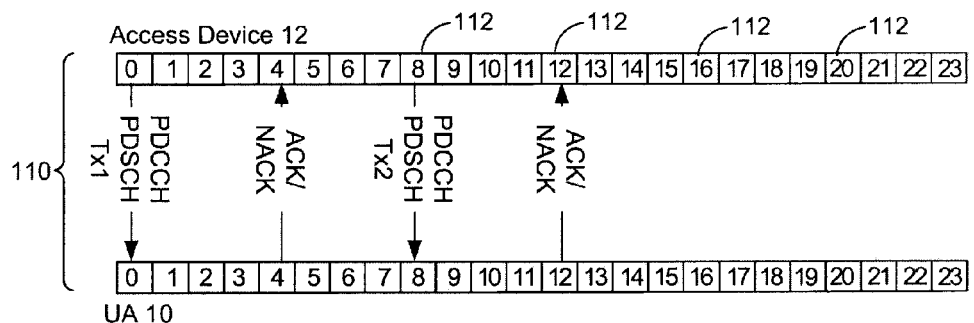
FIG. 3 is an illustration of a single carrier established between a UA and an access device having a plurality of subframes defined in the time domain.

FIG. 3 is an illustration of a single carrier 110 established between UA 10 and access device 12 having a plurality of subframes 112 defined in the time domain. Each row of boxes illustrates carrier 110 as seen by each of access device 12 and UA 10, with each single box representing a subframe of carrier 110. Accordingly, FIG. 3 illustrates the subframes at each of access device 12 and UA 10 and the messages or data that pass between access device 12 and UA 10 in several of the subframes. In some cases, the network may be configured to implement a Hybrid Automatic Repeat reQuest (HARQ) scheme or process to ensure the integrity of data passing between access device 12 and UA 10. As shown in FIG. 3, several HARQ messages are passed between access device 12 and UA 10.

A HARQ scheme may be used to re-transmit a traffic data packet to compensate for an incorrectly received traffic packet and may be used both in uplink and downlink transmissions. Take downlink transmissions for example. For each downlink packet received by a UA, a positive acknowledgment (ACK) may be transmitted on a Physical Uplink Control Channel (PUCCH) from the UA to the access device after a cyclic redundancy check (CRC) performed by the UA indicates a successful decoding. If the CRC indicates a packet is not received correctly, a UA HARQ entity transmits a negative acknowledgement (NACK) on the PUCCH to request a retransmission of the erroneously received packet. Once a HARQ NACK is transmitted to an access device, the UA waits to receive a retransmitted traffic data packet. When the HARQ NACK is received at a network node, the network node retransmits the incorrectly received packet to the UA. This process of transmitting data, ACK/NACK communications and retransmitting the data continues until either the packet is correctly received or a maximum number of retransmissions has been reached. Note that this figure shows the communications flow for only one of the available downlink HARQ processes.

Referring back to FIG. 3, for downlink packet transmission, the subframe containing the PDCCH is the same as the subframe containing the PDSCH that includes the data. In FIG. 3, therefore, in subframe 0, access device 12 transmits both the PDCCH (control) and the corresponding PDSCH (traffic) to UA 10. At the time the PDCCH is received, the UA initiates buffering or processing of the subframe allowing the UA to decode the PDCCH received in subframe 0. If UA 10 does not find an allocation intended for the UA, UA 10 may enter micro-sleep and does not need to continue buffering or processing the subframe. Alternatively, if UA 10 finds an allocation intended for the UA encoded within the PDCCH, the UA continues buffering or processing the subframe until the UA completely receives the subframe. After receiving the subframe, the UA may then attempt to decode the received PDSCH. After decoding, the UA may transmit ACK/NACK information in subframe 4 as shown on FIG. 3. In the event that decoding was not successful and the UA transmits a NACK in subframe 4, access device 12 may transmit another PDCCH and PDSCH combination in subframe 8 UA 10. This process can be repeated for additional HARQ transmissions.

When implementing carrier aggregation, the UA may be configured to receive a PDSCH on more than one carrier. Because the PDCCH and PDSCH occur in the same subframe, in conventional network configurations the UA buffers the PDSCH on each of the configured carriers (including the designated and/or any non-designated carriers) prior to determining whether the UA is granted a resource on any of the carriers. While this is consistent with existing timing protocols, this behavior requires additional power consumption at the UA (which reduces battery life). To minimize the UA's buffering requirements and reduce the UA's battery power consumption when using a multi-carrier network configuration, the present system and methods have been developed to provide PDCCH and PDSCH timing offset and/or designated carrier switching in multi-carrier communication systems.

In one implementation, to mitigate the buffering requirements of the UA and the corresponding power inefficiency, the PDSCH transmission on non-designated carriers is offset relative to the corresponding PDCCH grant while the PDSCH transmission on the designated carrier remains in the same subframe as the corresponding PDCCH grant.

The UA may be assigned one or multiple designated carriers. A designated carrier may be a carrier, the control channel of which the UA monitors (e.g., the PDCCH). A designated carrier can also be a carrier where a full set of Discontinuous Reception (DRX) parameters are configured for the UA. The designated carrier may also be used to perform synchronization, receive system information broadcasts, paging, etc. More generally, a designated carrier may be any one of the carriers that access device 12 assigns to UA 10. In one implementation, a designated carrier is an anchor carrier. The designated carrier or the anchor carrier may be a physical carrier of the serving access device, such as a serving eNB.

Figure 4A:
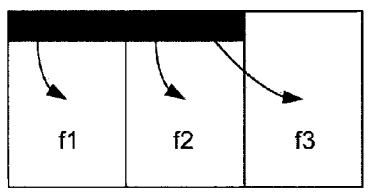
FIG. 4a is an illustration of a control channel implementation where a single PDCCH may allocate resources on one or more carriers.
Figure 4B:
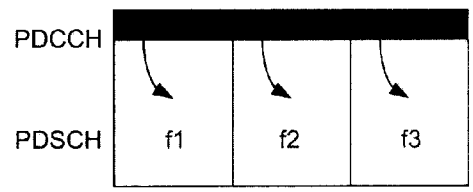
FIG. 4b is an illustration of a control channel implementation where each carrier within a multi-carrier network is allocated its own control channel for distributing control messages.

When implementing a multi-carrier communication network, a single control channel may be defined for each carrier that only allocates resources on a single carrier. Alternatively, a single control channel may allocate resources on more than one carrier. FIGS. 4a and 4b illustrate two different implementations of a control channel as applied to two or more carriers in a multi-carrier system. FIG. 4a illustrates a control channel implementation where a single PDCCH may allocate resources on one or more carriers. As shown, the PDCCH on carrier f1 only allocates resources on carrier f1. However, the PDCCH on carrier f2 allocates resources on both carriers f2 and f3. In this example, carrier f3 does not include a PDCCH as its resources are allocated by the PDCCH of carrier f2. In contrast, in FIG. 4b, each carrier within a multi-carrier network is allocated its own control channel for distributing control messages. In FIG. 4b the three carriers, f1, f2, and f3 each have a PDCCH for allocating resources on that specific carrier.

Figure 5:
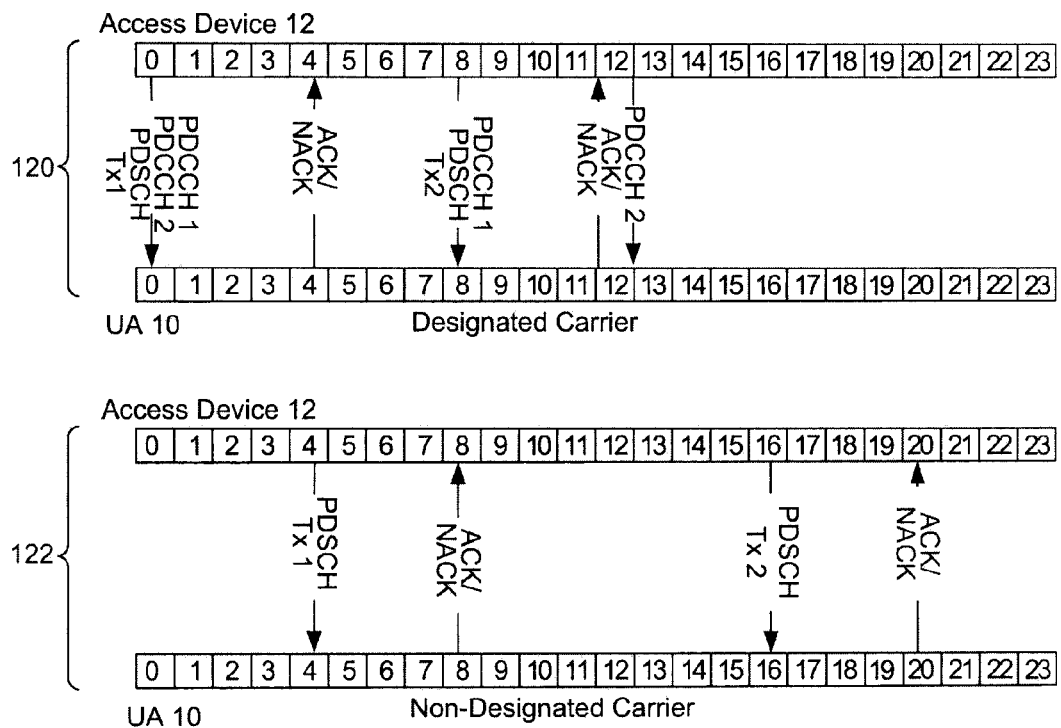
FIG. 5 is an illustration of an implementation of the present system where the designated carrier operates with a predetermined offset when allocating resources on a non-designated carrier.

In one implementation of the present system, a single PDCCH may be configured to allocate resources on one or more carriers (e.g., using the exemplary PDCCH of FIG. 4a). The system may include designated and non-designated carriers, where the PDCCH of the designated carriers allocate resources on both the designated and one or more non-designated carriers. For example, the PDCCH grants for the UA may be only transmitted from one or more designated carriers or carriers in a PDCCH monitoring Component Carrier (CC) set. As shown in FIG. 5, in one implementation of the present system, the PDCCH on the designated carrier operates in a conventional manner with respect to allocating resources on the designated carrier, but operates with a pre-determined timing offset when allocating resources on the non-designated carrier.

Referring to FIG. 5, designated carrier 120 may be configured to operate in accordance with existing standards. As such, designated carrier 120 broadcasts control messages via its PDCCH. Non-designated carrier 122, however, does not include a PDCCH. As a result, UA 10 only monitors the PDCCH of the designated carrier 120 for resource allocations on designated carrier 120 and/or non-designated carrier 122. Note that in some implementations of the present system UA 10 may monitor the PDCCH of multiple designated carriers and the system may implement HARQ processes on each of the carriers. In this example, however, only a single designated carrier using a single downlink HARQ process is illustrated.

In FIG. 5, the PDCCH grants for both designated carrier 120 and non-designated carrier 122 are transmitted to UA 10 via the PDCCH region of designated carrier 120. When the PDCCH allocates resources on designated carrier 120, the PDSCH transmission occurs in the same subframe as the corresponding PDCCH grant. As such, the operation of the PDCCH on designated carrier 120 may be in accordance with existing specifications. In alternative implementations, however, PDSCH resources grants on the designated carrier may also be offset in accordance with the present disclosure.

For non-designated carrier 122, however, the PDSCH transmission is offset from its corresponding PDCCH grant by a predetermined number of subframes (in FIG. 5, the transmission is offset by four subframes). The timing offset for data transmission on non-designated carrier 122 may be configured to be the same or similar offset to that used for uplink traffic in Rel-8 (i.e. 4 subframes), but, depending upon the system implementation, other offsets may be used. Furthermore, the offset may be dynamically or semi-statically configured via high layer signaling (e.g. with Radio Resource Control (RRC) signaling), or statically configured (according to a specified fixed offset), for example, specified by the standards. Depending upon the system implementation, the offset or time interval may be a fraction of a subframe, a single subframe, multiple subframes, a time duration, or any other measure of a duration of time or subframes.

Accordingly, as shown in FIG. 5, in subframe 0, access device 12 transmits PDCCH grants PDCCH1 and PDCCH2. PDCCH1 includes a grant of resources on designated carrier 120. PDCCH2 includes a grant of resources on non-designated carrier 122. Both PDCCH1 and PDCCH2 are transmitted to UA 10 over designated carrier 120 in subframe 0. After receiving the PDCCH messages, UA 10 begins buffering/processing the subframe while decoding both PDCCH1 and PDCCH2. If UA 10 decodes the grant and the grant is for designated carrier 120 (i.e., PDCCH1), UA 10 continues buffering/processing the PDSCH region of the same subframe (i.e., subframe 0) on designated carrier 120. If, however, UA 10 decodes the grant and the grant is for non-designated carrier 122 (PDCCH2), UA 10 is configured to activate the corresponding non-designated carrier 122 to buffer/process the PDSCH in an offset subframe of non-designated carrier 122 at the appropriate time. As shown in FIG. 5, after receiving the PDCCH allocating resources on non-designated carrier 122 in subframe 0 on designated carrier 120, UA 10 enables non-designated carrier 122 to buffer/process the PDSCH transmitted in the offset subframe 4 (e.g., occurring 4 ms later) on non-designated carrier 122.

Using the present system, UA 10 does not need to activate the non-designated carrier until it receives a PDCCH grant for the non-designated carrier (e.g., PDCCH2 of FIG. 5). Because the allocated PDSCH region on the non-designated carrier is offset or delayed by 4 ms, after receiving a PDCCH allocating resources on the non-designated carrier, UA 10 can wait a period of time before enabling the non-designated carrier. As such, the UA has enough time to activate the non-designated carrier and buffer/process the corresponding PDSCH on the non-designated carrier after receiving the PDCCH on the designated carrier.

By delaying the activation of the non-designated carrier, UA battery consumption may be minimized because the UA can remain in a sleep mode on the non-designated carrier most of the time—the non-designated carrier is only enabled when the UA receives a PDCCH via the designated carrier that allocates resources on the non-designated carrier. In some implementations, the UA may execute two types of sleep modes. First, "Sleep" (potentially the same as Discontinuous Reception or DRX) may occur when the RF chain is turned off. This type of sleep may extend over a longer period of time (e.g. at least several subframes) because it takes a certain amount of time (e.g. 1-2 subframes) to turn the RF chain back on. In contrast, "Micro sleep" occurs when the RF chain stays on all the time, but baseband processing (e.g. buffering and processing of PDSCH samples) can be turned off as soon as the PDCCH has been checked and no PDSCH allocation has been found for the UA. Therefore, in this scenario, the UA may remain in sleep mode on the non-designated carrier for most of the time, thereby reducing the UA's battery power consumption.

After the UA attempts to decode the PDSCH on non-designated carrier 122, the UA may transmit ACK/NACK information in subframe 8 on the corresponding uplink carrier. In the event of a NACK, access device 12 may transmit another PDCCH in subframe 12 on designated carrier 120 (PDCCH2). In that case, the corresponding PDSCH with re-transmission may occur in subframe 16 on non-designated carrier 122 (again, offset by 4 subframes).

In the example shown in FIG. 5, on the downlink, UA 10 only buffers/processes the PDSCH region of subframe 4 and subframe 16 while remaining in the discontinuous reception mode for most of the time on non-designated carrier 120. The UA may be configured to only buffer/process the PDSCH region of certain subframes on non-designated carrier 122 while remaining in the discontinuous reception mode on non-designated carrier 122 for the majority of time. By remaining in discontinuous reception mode, the UA may minimize energy consumption. The 4 ms offset (or, alternatively, a different offset value) is configured to give enough time for UA 10 to activate non-designated carrier 122 to prepare for PDSCH buffering/processing.

In other implementations of the present system, however, the PDSCH resource allocations on both the designated and non-designated carriers may be offset from the PDCCH transmission establishing those resource allocations in accordance with the present disclosure. In some cases, the offset on both the designated and non-designated carriers may be the same number of subframes, or the same time duration (e.g., resource allocations on both the designated and non-designated carriers are offset from the PDCCH by 4 subframes or 4 ms). In other cases, however, the PDSCH resource allocations on both the designated and non-designated carriers are offset by different and non-zero amounts from the PDCCH.

Figure 6:
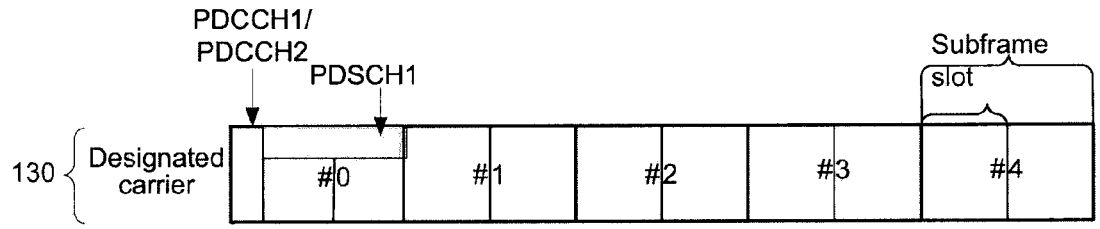
FIG. 6 is an illustration of an implementation of the present system where the offset between the Physical Downlink Shared CHannels (PDSCHs) on the designated carrier and the non-designated carrier is less than one subframe.
Figure 6:
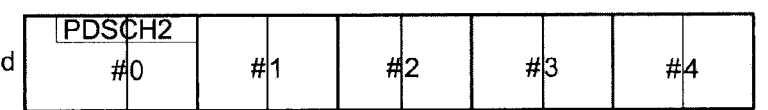
Figure 6:
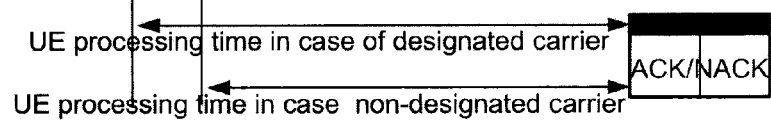

FIG. 6 is an illustration of an alternative implementation of the present system wherein the offset 134 between the PDSCHs on the designated carrier and the non-designated carrier is smaller than one subframe of a carrier. In this example, offset 134 for the non-designated carrier may be configured using RRC signaling or specified by the standards and, in some implementations, the offset value may be an integer multiple of Orthogonal Frequency-Division Multiplexed (OFDM) symbols or 1 slot. Note that an offset value of at least 1 slot delay may require that the downlink subframe boundaries of different carriers to not be aligned with each other when transmitted by access device 12 (as illustrated by FIG. 6).

With reference to FIG. 6, PDSCH resources are scheduled for designated carrier 130 and non-designated carrier 132 in accordance with the implementation shown in FIG. 5. That is, PDCCHs allocating resources on both designated carrier 130 and non-designated carrier 132 are transmitted in the same subframe using designated carrier 130. If the PDCCH allocates resources on designated carrier 130, UA 10 buffers/processes the PDSCH on designated carrier 130 for that subframe. If, however, the PDCCH allocates resources on non-designated carrier 132, UA 10 enables non-designated carrier 132 and then, after a pre-determined delay, begins buffering/processing the PDSCH on non-designated carrier 132. In the implementation illustrated in FIG. 6, however, access device 12 transmits the PDSCH of non-designated carrier 132 in the same subframe as the corresponding PDCCH resource indication.

Referring to FIG. 6, UA 10 receives the PDCCH in subframe 0 on designated carrier 130. If the grant is for the PDSCH on non-designated carrier 132, UA 10 activates the corresponding non-designated carrier and begins buffering/processing the PDSCH of non-designated carrier 132 in subframe 0 of non-designated carrier 132. Because the PDSCH of the non-designated carrier is transmitted the offset time later, UA 10 may have sufficient time to determine whether UA 10 should activate the reception of non-designated carrier 132 based on the outcome of the PDCCH decoding. In other words, UA 10 does not need to buffer/process the PDSCH of non-designated carrier 132 when there is no PDCCH grant on that carrier. In some cases, however, the RF chain of UA 10 may stay on consistently because offset smaller than one subframe may not provide sufficient time to turn on the RF chain if the RF chain is off.

In the implementation of FIG. 6, UA 10 may still be configured to transmit the HARQ ACK/NACK 4 subframes after receiving the PDSCH. As such, UA 10 may not need to change the timing of the ACK/NACK transmission.

Figure 7:
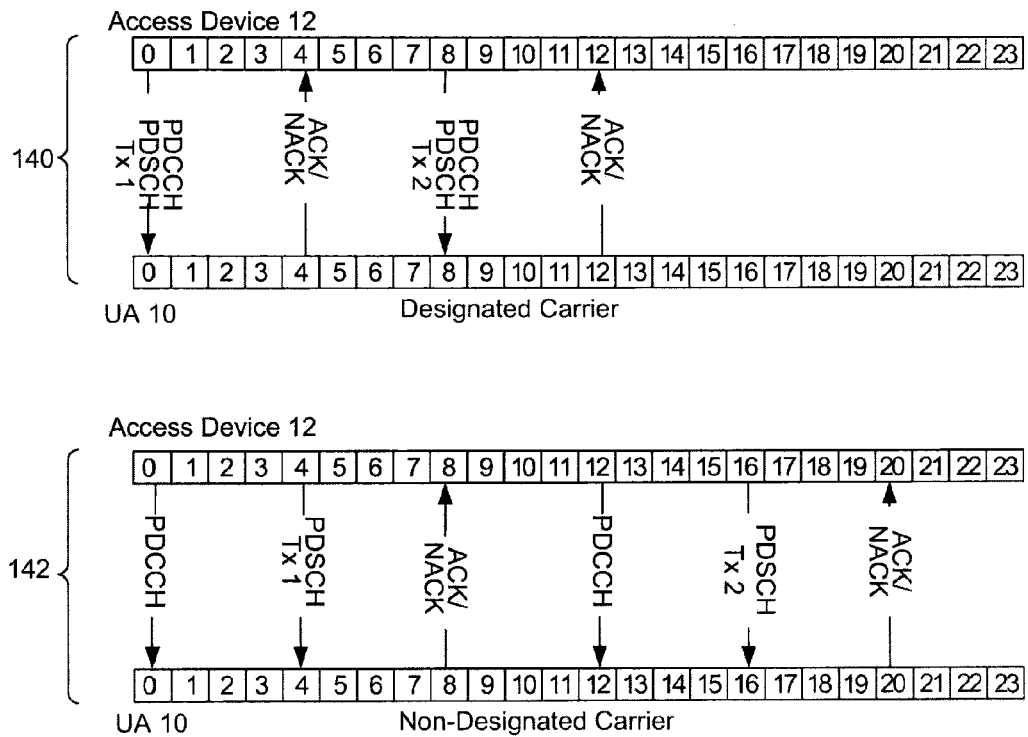
FIG. 7 is an illustration of an implementation of the present system where both a designated carrier and a non-designated carrier broadcast control channels for allocating resources.

In some implementations of the present system, each carrier in a multi-carrier network broadcasts a control channel (e.g., a PDCCH). For example, each carrier may use the PDCCH configuration illustrated in FIG. 4b. Using such a PDCCH configuration, FIG. 7 illustrates an implementation of the present system wherein both the designated carrier 140 and non-designated carrier 142 broadcast control channels for allocating resources. As shown in FIG. 7, designated carrier 140 may operate in accordance with existing standards. However, in non-designated carrier 142, the PDSCH transmission is offset from its corresponding PDCCH by a pre-determined number of subframes. In some cases, the timing offset is set to four subframes to be the same offset as used for uplink traffic in Rel-8. However, other offsets such as any number of subframes may be used. The offset can be dynamically or semi-statically configured (e.g. with RRC signaling), or statically configured. In some implementations, in designated carrier 140, the PDSCH transmission may also offset from its corresponding PDCCH by a pre-determined number of subframes. Accordingly, the PDCCH on the designated carrier may allocate resources on both the designated carrier and a non-designated carrier at a time or in a subframe other than the time or subframe in which the original PDCCH was transmitted.

As shown in FIG. 7, for non-designated carrier 142, in subframe 0, access device 12 transmits a PDCCH control message to UA 10. At that time, UA 10 begins buffering/processing the subframe to decode the PDCCH. Regardless of whether UA 10 detects a valid grant in subframe 0, if UA 10 did not receive a valid grant an offset number of subframes earlier (e.g., subframe-4), UA 10 may enter micro-sleep mode and does not need to continue buffering/processing the subframe.

For example, if UA 10 does not decode a grant in subframe 0 on non-designated carrier 142, then UA 10 may immediately enter micro-sleep mode for the remainder of subframe 4 (corresponding to the PDSCH in that subframe) after receiving the PDCCH of subframe 4. If, however, UA 10 detects a grant in subframe 0 on non-designated carrier 142, UA 10 prepares to receive the PDSCH in subframe 4 on non-designated carrier 142 regardless of the PDCCH content in subframe 4. After processing subframe 4 in a similar manner, the UA may buffer/process the entire subframe. After attempting to decode the PDSCH in subframe 4, UA 10 may then transmit ACK/NACK information in subframe 8 on non-designated carrier 142. In the event of a NACK, access device 12 may transmit another PDCCH in subframe 12 and the corresponding PDSCH with re-transmission in subframe 16, all on non-designated carrier 142.

In this implementation, UA 10 is configured to monitor the PDCCH region of non-designated carrier 142 as well as that of designated carrier 140. However, the UA may potentially enter micro-sleep mode during the non-allocated PDSCH regions of subframes of the non-designated carrier 142. The micro-sleep duration in this approach may be longer than that in conventional network implementations where the PDCCH and the corresponding PDSCH are transmitted in the same subframe (as is the case for Rel-8). When both the PDCCH and PDSCH are transmitted together, it may be necessary to begin buffering the PDSCH of the same subframe until the PDCCH has been decoded, whereas for the case where the PDCCH is transmitted in an earlier subframe (as in non-designated carrier 142 in FIG. 7), there may be sufficient time to decode the PDCCH before the corresponding PDSCH is transmitted.

In some implementations of the present system, the use of an offset between a PDCCH transmission and its corresponding PDSCH for non-designated carriers is configured using RRC signaling. For example, two non-designated carriers may each use an offset of 4 subframes, and two other non-designated carriers can use a different offset, or no offset whatsoever. The offset information for a non-designated carrier may be implicitly signaled by its corresponding carrier index or location on the PDCCH (e.g., using a pre-defined mapping rule). Alternatively, the offset information may be explicitly signaled within the contents of a particular DCI.

The PDCCH-PDSCH timing offset may be enabled or disabled for one or multiple carriers. When disabled, the PDCCH and the corresponding PDCCH may each occur in the same subframe on a particular carrier. This information could be implicitly or explicitly signaled by an access device such as an eNB.

The access device may place traffic on either the designated carrier or non-designated carrier depending on the QoS requirements. For example, voice services may be provided via the designated carrier and best effort service can be provided via the non-designated carrier. In this way, the additional delay resulting from the PDSCH offset from the PDCCH does not impact delay sensitive services.

In some network configurations, the uplink ACK/NACK resource used to acknowledge the successful or failed reception of a PDSCH is mapped to the lowest CCE where the corresponding PDCCH grant is sent. In the present system, however, because the PDSCH transmission on a non-designated carrier may be delayed (for example, by 4 ms), the ACK/NACK resource used by a first UA may collide with an ACK/NACK resource used by a second UA whose PDCCH is transmitted on the same designated carrier. To prevent collisions of uplink ACK/NACK resources, in one embodiment, a separate ACK/NACK resource region is defined for UAs whose PDSCH assignment is on a non-designated carrier. The separate ACK/NACK resource region may be identified by the access device using broadcast RRC signaling. Alternatively, in another embodiment, the lowest CCE of a PDCCH on a designated carrier along with the carrier indicator (or carrier index) of the non-designated carrier on which the corresponding PDSCH is transmitted is used to determine the ACK/NACK resources. For example, the ACK/NACK can be transmitted over a channel, with the channel number being determined using both the index of the lowest CCE of a PDCCH on the designated carrier, and the carrier indicator (or carrier index) of the non-designated carrier on which the corresponding PDSCH is transmitted.

In some implementations of the present system, the offset between the PDCCH resource allocation and the corresponding PDSCH transmission is dynamically signaled by the PDCCH, either explicitly within the DCI or implicitly via the DCI's position within the PDCCH. For example, two bits within a non-designated carrier's DCI may be used to specify a PDSCH offset of 1, 2, 3, or 4 subframes (e.g., using binary values '00', '01', '10' and '11').

Figure 8:
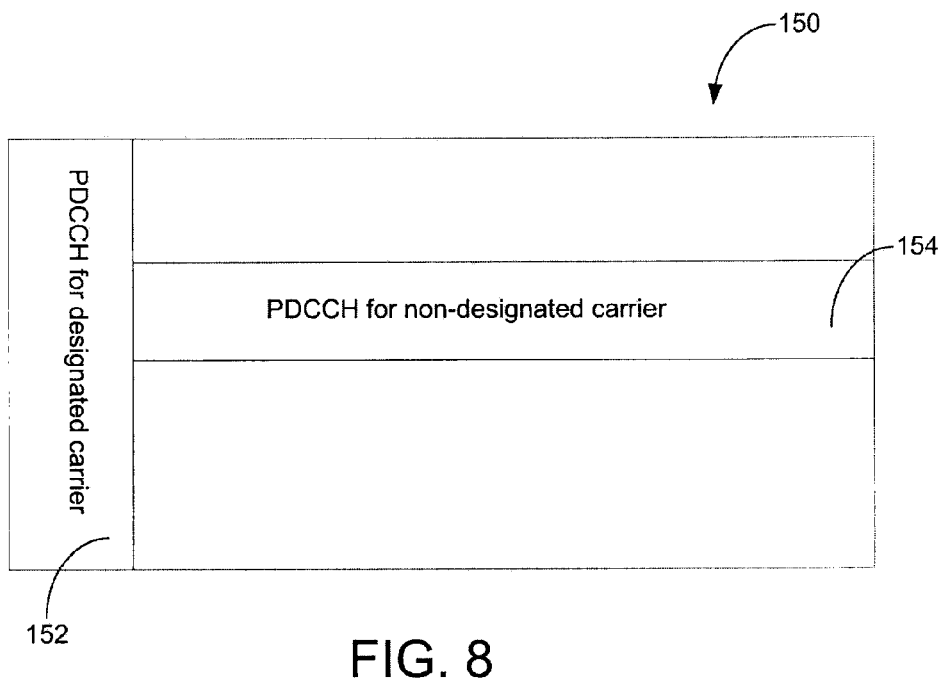
FIG. 8 is an illustration of a PDCCH encoding resource allocations on both a designated and non-designated carrier.

Alternatively, in some implementations, when the PDCCH for a non-designated carrier is signaled by a PDCCH on a designated carrier (see, for example, the PDCCH structure of FIG. 4a), a logical format for the PDCCH, such as that shown in FIG. 8 may be used. FIG. 8 is an illustration of a PDCCH that encodes resource allocations on both a designated and non-designated carrier. In FIG. 8, subframe 150 includes separate PDCCH instructions: PDCCH 152 allocating resources on the designated carrier and PDCCH 154 allocating resources on the non-designated carrier. In FIG. 8, the PDCCH for the non-designated carrier is separate from the PDCCH for the designated carrier. As such, the non-designated carrier's PDCCH may look like a PDSCH resource allocation to Rel-8 UAs. The structure illustrated in FIG. 8 may also be used if the PDCCHs for the designated and non-designated carriers are transmitted within a combined resource space.

Figure 9:
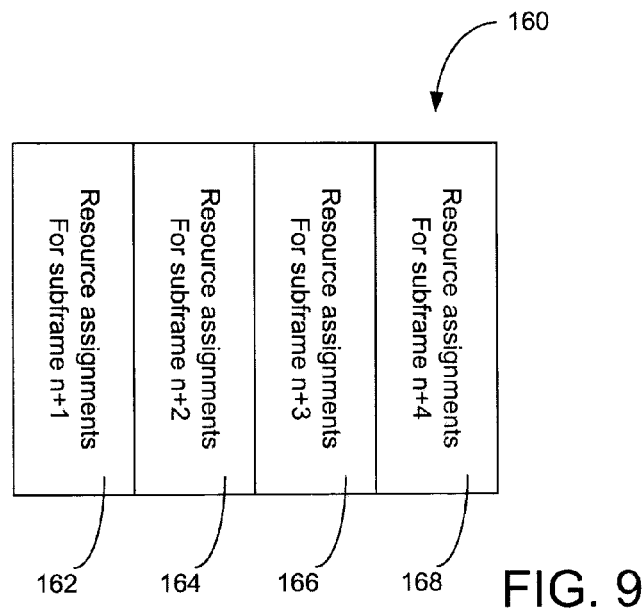
FIG. 9 is an illustration of a Physical Downlink Control CHannel (PDCCH) that includes several PDSCH resource allocations.

If the offset for a particular PDCCH resource allocation is dynamically signaled, it may also be possible to include PDSCH allocations that cover multiple subframes in a single PDCCH. FIG. 9 is an illustration of a PDCCH 160 that includes PDSCH resource allocations 162, 164, 166, and 168. By combining the allocation of multiple PDSCH resources within a single PDCCH it may only be necessary to transmit the PDCCH for the non-designated carrier only on a subset of available subframes (e.g., every two or four subframes), rather than only every subframe. Although FIG. 9 illustrates resource assignments on the PDCCH being grouped separately according to the corresponding PDSCH offset, the illustration is only an exemplary representation. Consequently, the resource assignments for different PDSCH subframe offsets could be intermixed with each other within the PDCCH.

In the present system, regardless of the carrier containing the PDCCH, if the PDCCH allocates PDSCH resources on a non-designated carrier, the PDSCH may be offset relative to the PDCCH. Furthermore, if the PDCCH points to a PDSCH on a designated carrier, the PDSCH may not be offset relative to the PDCCH on the designated carrier. In one implementation, the UA only buffers/processes the PDSCH region of certain subframes on the non-designated carrier while remaining in sleep mode on the non-designated carrier most of the time. As a result, the battery power consumption of the UA may be significantly reduced.

In some cases, carrier aggregation may be used for dynamic load balancing across carriers rather than for increasing the instantaneous data rate of a UA. As packet data traffic may be sporadic in nature, a carrier may become congested for a short period of time as it is subject to a sudden increase in traffic for users using that carrier. In that case, the system may be configured to schedule some of the users on their non-designated carriers, especially for delay sensitive services such as interactive video, interactive gaming, etc. Furthermore, in many cases, the user may not need to be scheduled on multiple carriers. For example, in many mobile applications, the required data rate may not go above 1 Mbps. As such, when a UA is scheduled on a non-designated carrier to avoid congestion on the designated carrier, the UA does not need to be assigned PDSCH resources on the designated carrier at the same time—thereby minimizing the power consumption of the UA.

Accordingly, in one implementation of the present system, when a UA receives a resource grant on the PDCCH of its designated carrier (including an explicit or implicit switch indication) that assigns a PDSCH resource on a non-designated carrier, the non-designated carrier becomes the designated carrier for the UA, and the UA stops signal reception on the current designated carrier. In another implementation, when a UA receives a resource grant on the PDCCH of its designated carrier (including an explicit or implicit switch indication) that assigns a PDSCH resource on a non-designated carrier, the non-designated carrier becomes the designated carrier for the UA, and, if indicated by the access device, the UA continues signal reception on the current designated carrier which becomes the non-designated carrier.

The PDCCH grant may include an explicit designated carrier switch indication. For example, one bit may be included in the DCI to indicate whether the UA should switch to the corresponding non-designated carrier, which then becomes the designated carrier, and stop signal reception on the current designated carrier, possibly pending completion of any HARQ retransmissions on the current designated carrier. Alternatively, an explicit switch indication may not be included in the PDCCH grant and the switch instruction may be communicated implicitly. For example, if the UA received PDCCH grants for PDSCH resources on both the designated carrier and the non-designated carrier, the UA may be configured to interpret the grants as not requiring a switch. If, however, the UA receives a PDCCH grant for a PDSCH resource on a non-designated carrier and does not receive a PDCCH grant for a PDSCH resource on the designated carrier, the UA may be configured to interpret that PDCCH grant as requiring a switch of designated carrier. If the UA receives multiple PDCCH grants, an explicit indicator (e.g., one bit indicator in the DCI formats) or implicit method (e.g., the carrier indicated by the first received PDCCH grant) could be used to switch the designated carrier. In another implementation, in addition to the explicit or implicit designated switch indication, the PDCCH grant may include another indication in the DCI to indicate whether the UA should stop signal reception on the then-designated carrier. Alternatively, the indication of whether the UA should stop signal reception on the current designated carrier may be signaled using higher layer signaling such as RRC signaling. In that case, the UA may be configured through higher layer signaling such as RRC signaling to either continue or stop signal reception on the current designated carrier when an explicit or implicit designated carrier switch indication is received on the PDCCH grant.

In dynamic carrier switching, the consequences of a false detection may be severe, with the access device transmitting on one carrier to the UA, while the UA is only listening on a different carrier. Accordingly, in the present system, when dynamically switching carriers, error protection may be integrated into the switching process. As such, the system may be configured to validate any PDCCH transmissions used for dynamic switching by verifying the values of certain fields within the corresponding DCI against pre-specified expected values for such an instruction. In a further embodiment, a new DCI structure may be defined which only conveys the dynamic designated carrier switch command without any actual PDSCH assignment. Such a DCI may include the carrier indicator of the new designated carrier.

In one implementation of the present system, after the UA receives a PDCCH that allocates a PDSCH resource on a non-designated carrier and that includes an explicit or implicit switch indication, the UA sends an UL ACK four subframes later on the UL ACK/NACK resource that corresponds to the lowest CCE index of the PDCCH sent on the designated carrier. The UL ACK acknowledges successful reception of the PDCCH grant. As such, the access device will know with reasonable certainty that the UA will switch to the corresponding non-designated carrier and the non-designated carrier will become the new designated carrier for the UA. After the access device receives a UL ACK/NACK for the PDSCH, the access device may start scheduling PDSCH resources to the UA on one or more or all of the parallel HARQ channels on the new designated carrier using a PDCCH grant sent on the new designated carrier.

The access device may be further configured to send a PDCCH grant to the UA that allocates a PDSCH resource on a non-designated carrier 4 subframes later and indicates no carrier switch is required. In this case, the UA does not need to send a UL ACK corresponding to the PDCCH grant, but the UA may send a UL ACK/NACK corresponding to the PDSCH traffic once it is received.

Figure 10:
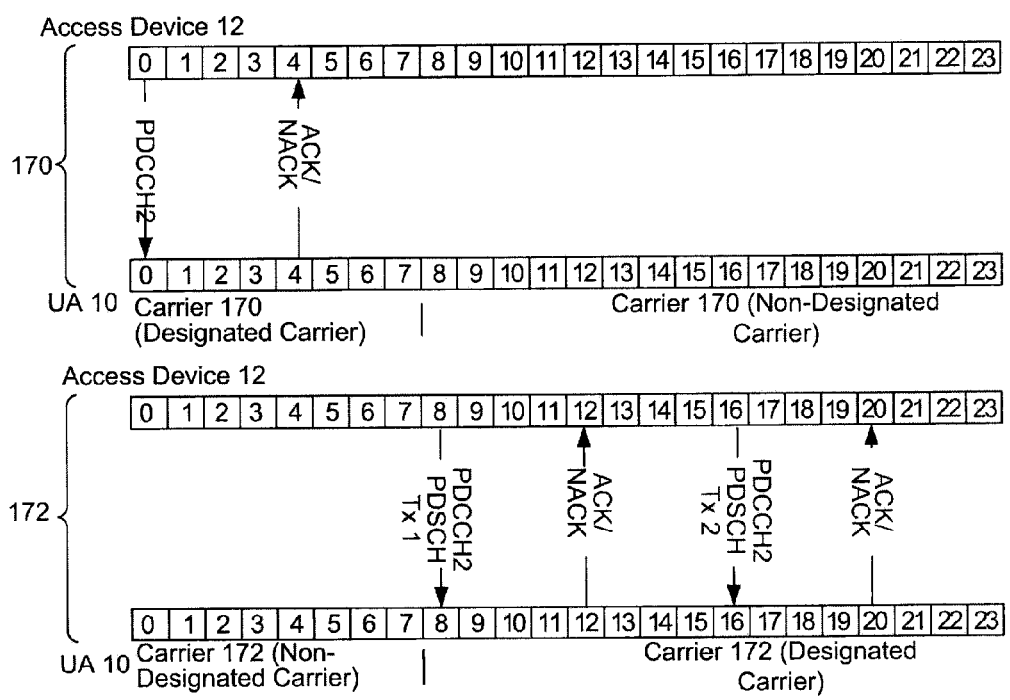
FIG. 10 is an illustration of a UA implementing carrier switching where the UA provides explicit acknowledgement of the carrier switch to an access device.

For example, FIG. 10 is an illustration of a UA implementing carrier switching wherein the UA provides explicit acknowledgement of the carrier switch to the access device. At subframe 0 of FIG. 10, the UA receives a PDCCH grant on designated carrier 170 that indicates a switch to non-designated carrier 172 is required. At subframe 4, the UA sends an UL ACK to access device 12 on the UL ACK/NACK resource that corresponds to the lowest CCE of the received PDCCH grant on designated carrier 170. At subframe 8, access device 12 starts scheduling PDSCH transmission to UA 10 on non-designated carrier 172 and transmits the corresponding PDCCH grant on non-designated carrier 172. At subframe 8, when access device 12 schedules the first PDCCH and PDSCH transmissions on carrier 172, UA 10 can confirm that access device 12 has received the UL ACK. As such, UA 10 switches the designated carrier from carrier 170 to carrier 172, with carrier 170 becoming the non-designated carrier.

In the implementation illustrated in FIG. 10, an error condition may exist where the UA has successfully received a PDCCH grant in subframe 0 from designated carrier 170 that indicates a switch to carrier 172 is required. After receiving the PDCCH, the UA sends an UL ACK to the access device in subframe 4, but the access device fails to decode the UL ACK. In that case, the access device may retransmit the PDCCH grant in subframe 8 on carrier 170. At subframe 8, however, the access device will not transmit PDCCH and PDSCH to the UA on carrier 172.

To mitigate the error condition, at the UA side, the UA will continue to monitor the PDCCH on both carriers at subframe 8 and potentially previous and subsequent subframes. If the UA decodes a valid PDCCH grant on carrier 170 and does not decode a valid PDCCH grant on carrier 172, the UA may infer that the access device has failed to decode the previous UL ACK sent by the UA. In that case, the UA may delay the switching of the designated carrier. The UA can send an UL ACK to the access device to acknowledge the reception of the PDCCH grant on carrier 170. Similar procedures as those discussed above may then be implemented until the UA has confirmed that the access device has successfully received the UL ACK.

In another potential error scenario, the UA fails to receive the PDCCH grant sent by the access device in subframe 0 on carrier 170. Therefore, the UA does not send an UL ACK on subframe 4. However, the access device may have a false alarm detection and may determine that the UA has sent an UL ACK on subframe 4. The access device may then start transmitting PDCCH and PDSCH on carrier 172 to the UA assuming that the UA has switched the designated carrier to carrier 172. However, because the UA did not switch to carrier 172, the UA will miss the PDCCH and PDSCH transmission from the access device and will not send UL ACK or NACK to the access device to acknowledge the transport block transmitted on the PDSCH. In that case, after a predefined number (N) of failed detections of UL ACK or NACK from the UA on carrier 172, the access device may be configured to determine that the UA has failed to switch to carrier 172. The access device may then switch back to carrier 170 and start transmitting PDCCH and PDSCH to the UA on carrier 170.

To reduce the latency of detection of the error scenario at the access device, the value of N can be configured to a small value by using a conservative CCE aggregation level for the PDCCH transmission to the UA on carrier 172. As such, the UA will successfully receive the PDCCH transmission with a high probability and therefore will send a UL ACK or NACK to the access device to acknowledge successful or failed reception of the corresponding PDSCH transmission. Additionally, the likelihood of the error scenario may be reduced by the access device using a conservative CCE aggregation level for the PDCCH grant transmission on carrier 170 when the PDCCH grant indicates that a carrier switch is required. In this way, the likelihood that the UA will fail to receive the PDCCH grant will be minimized. The access device may also send multiple carrier switch instructions over consecutive subframes to increase the probability that the UA will receive at least one of these instructions correctly.

Figure 11:
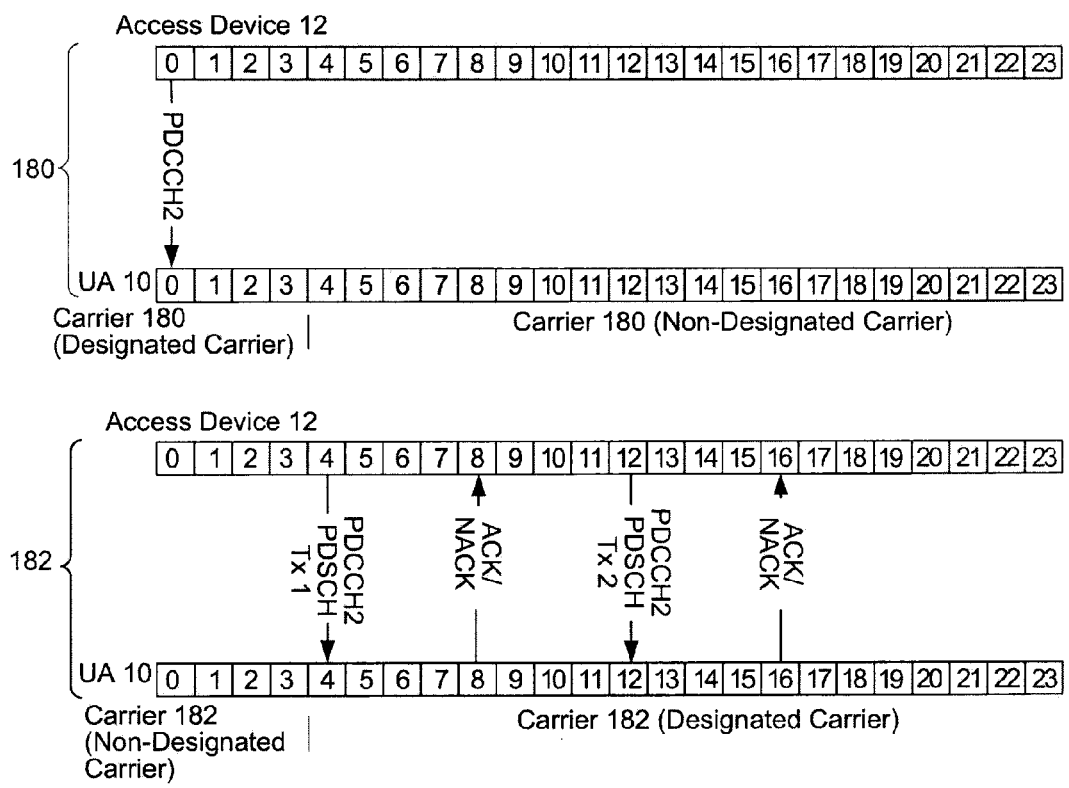
FIG. 11 is an illustration of a UA implementing carrier switching where the UA does not provide explicit acknowledgement of the carrier switch to an access device.

In another implementation of the present system, when the UA receives a PDCCH grant for a PDSCH resource of a non-designated carrier with explicit or implicit switch indication that indicates a switch is required, the UA does not send an UL ACK to acknowledge the reception of the PDCCH grant. FIG. 11 is an illustration of a UA implementing carrier switching wherein the UA does not provide explicit acknowledgement of the carrier switch to the access device. In the figure, at subframe 0, the UA receives a PDCCH grant on the designated carrier 180 that indicates a switch to non-designated carrier 182 is required. At subframe 4, the access device schedules the first PDCCH and PDSCH transmissions on carrier 182 to the UA. At subframe 8, the UA sends an UL ACK or NACK to the access device to acknowledge successful or failed reception of the PDSCH. If the access device successfully detects the UL ACK or NACK transmission from the UA on subframe 8, the access device can confirm that the UA has switched to carrier 182 as designated carrier. The access device may start scheduling PDSCH transmission to the UA on all subsequent subframes on the parallel HARQ channels.

The present system, however, may be subject to an error condition wherein the UA fails to decode the PDCCH grant sent by the access device in subframe 0 on carrier 180, which indicates that a switch to carrier 182 is required. In that case, the UA may not switch to enable reception on carrier 182 in subframe 4 and will miss the PDCCH and PDSCH transmission from the access device on carrier 182. This error scenario, however, may be mitigated using a similar method as that described above. After a pre-defined number (N) of failed detections of UL ACK or NACK from the UA on carrier 182, the access device may be configured to determine that the UA has failed to switch to carrier 182. In that case, the access device may switch back to carrier 180 and start transmitting PDCCH and PDSCH to the UA on carrier 180.

To reduce the latency of detection of the error scenario at the access device, the value of N can be configured to a small value by using a conservative CCE aggregation level for the PDCCH transmission to the UA on carrier 182. As such, the UA may successfully receive the PDCCH transmission with high probability and therefore will send a UL ACK or NACK to the access device acknowledging successful or failed reception of the corresponding PDSCH transmission from the access device.

Additionally, the likelihood of the error scenario may be reduced by the access device using a conservative CCE aggregation level for the PDCCH grant transmission on carrier 180 when the PDCCH grant indicates that a carrier switch is required. Accordingly, the likelihood that the UA will fail to receive the PDCCH grant will be small. The access device may also send multiple carrier switch instructions over consecutive subframes to increase the probability that the UA will receive at least one of these instructions correctly.

Figure 12:
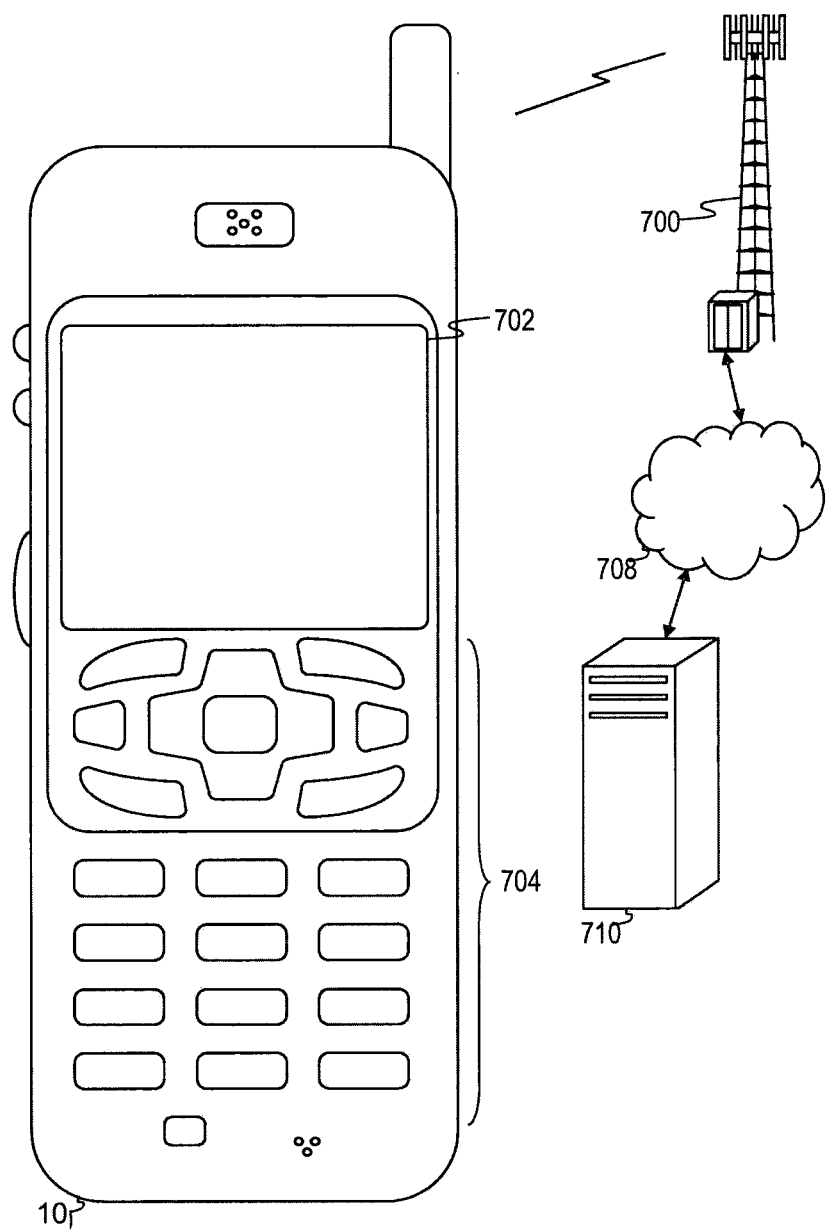
FIG. 12 is a diagram of a wireless communications system including a UA operable for some of the various embodiments of the disclosure.

FIG. 12 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 13:
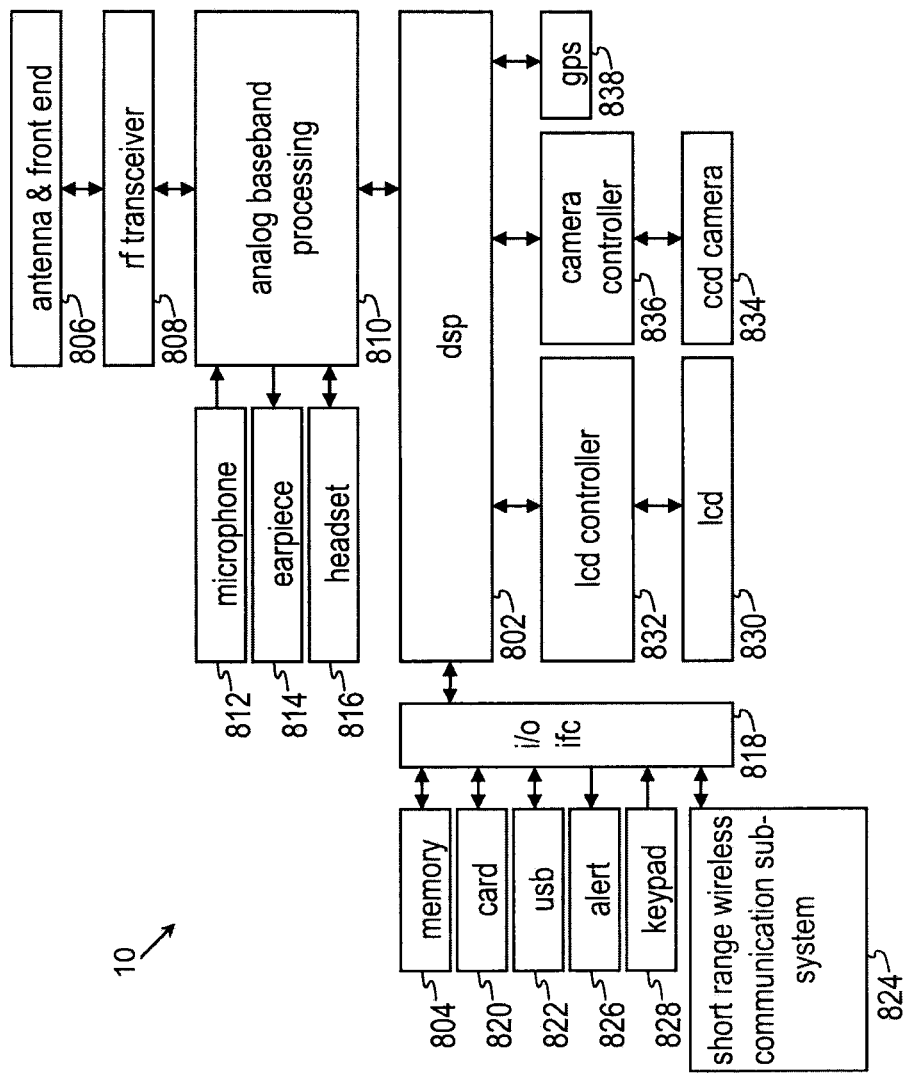
FIG. 13 is a block diagram of a UA operable for some of the various embodiments of the disclosure.

FIG. 13 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 14:
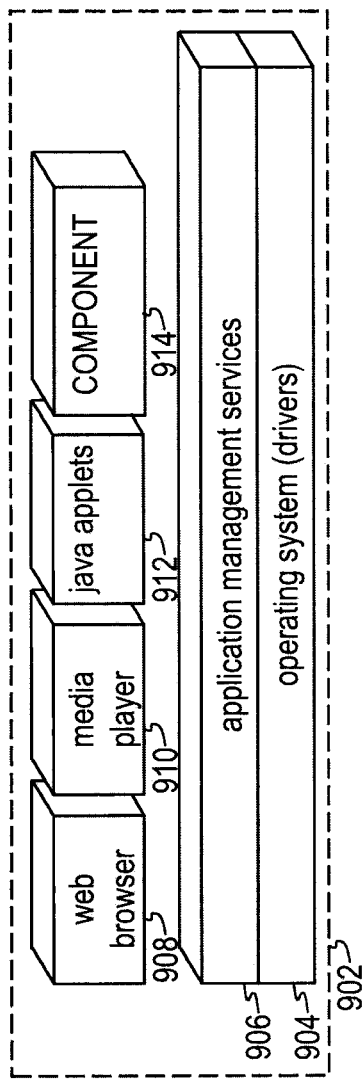
FIG. 14 is a diagram of a software environment that may be implemented on a UA operable for some of the various embodiments of the disclosure.

FIG. 14 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 14 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 15:
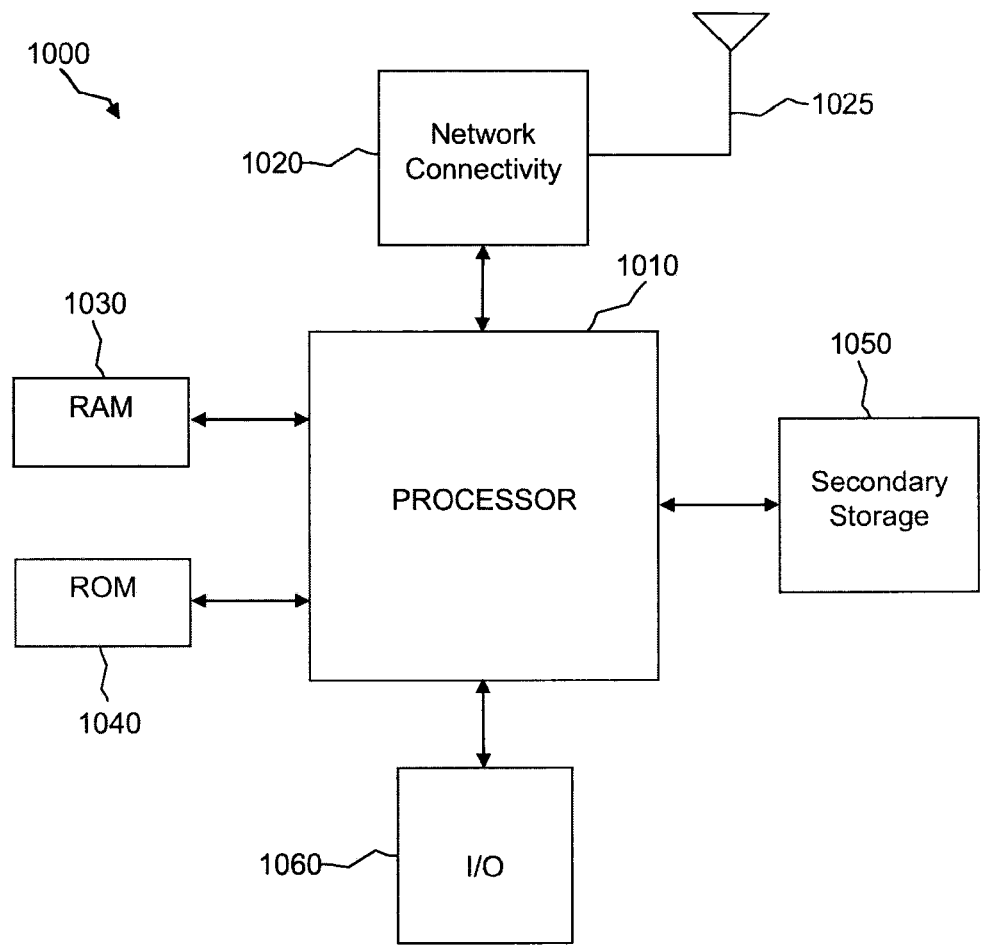
FIG. 15 is an illustrative general purpose computer system suitable for some of the various embodiments of the disclosure.

The UA 10, access device 120, and other components described above might include a processing component that is capable of executing instructions related to the actions described above. FIG. 15 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference: TS 36.321, TS 36.331, and TS 36.300, TS 36.211, TS 36.212 and TS 36.213.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this invention, the following claims are made:

What is claimed is:

1. A method for receiving data using a user agent (UA) configured to communicate with a wireless communications network using a first and second communication carrier, comprising:

receiving, from an evolved universal terrestrial radio access network (E-UTRAN) node B (eNB), resource information on a physical downlink control channel (PDCCH) during a first time interval, the resource information allocating a physical downlink shared channel (PDSCH) resource on at least one of the first communication carrier or the second communication carrier, wherein the first time interval is a first subframe on the first communication carrier;

when the resource information allocates a PDSCH resource on the first communication carrier, receiving data using the first communication carrier during a second time interval, wherein the second time interval is a second subframe on the first communication carrier; and when the resource information allocates a PDSCH resource on the second communication carrier, determining a third time interval by adding a predetermined subframe offset to the first time interval and receiving data using the second communication carrier during the third time interval, wherein the third time interval is a third subframe on the second communication carrier, the third time interval being different from and subsequent to the first time interval, wherein the third subframe is offset from the first subframe on the first communication carrier by one of 1, 2, 3, or 4 subframes.

2. The method of claim 1, wherein each of the first time interval, the second time interval, and the third time interval identify subframes on at least one of the first or second communication carrier.

3. The method of claim 1, wherein the first time interval occurs at approximately the same time as the second time interval.

4. The method of claim 1, wherein the second time interval is offset from the first time interval.

5. The method of claim 1, wherein the resource information is received using the first communication carrier.

6. The method of claim 1, wherein the offset of between the third time interval and the first time interval is configured using Radio Resource Control (RRC) messages.

7. The method of claim 1, wherein the offset between the third time interval and the first time interval is implicitly signaled by a carrier index value of the second communication carrier.

8. The method of claim 1, wherein the offset between the third time interval and the first time interval is implicitly signaled by a predefined mapping rule.

9. The method of claim 8, wherein the predefined mapping rule uses a location of the resource information on the PDCCH provided by the first communication carrier.

10. The method of claim 1, wherein the offset between the third time interval and the first time interval is preconfigured.

11. The method of claim 1, including, when the resource information allocates a PDSCH resource on a third communication carrier, receiving data using the third communication carrier during the second time interval.

12. The method of claim 1, wherein the resource information allocates a PDSCH resource on at least one of the first or second communication carrier in accordance with a quality of service (QoS) requirement of the wireless communications network.

13. The method of claim 1, including:
when the resource information allocates a PDSCH resource on the first communication carrier, transmitting at least one of an acknowledgement or a non-acknowledgement (ACK/NACK) message using a first ACK/NACK resource; and when the resource information allocates a PDSCH resource on the second communication carrier, transmitting an ACK/NACK message using a second ACK/NACK resource.

14. The method of claim 13, wherein the allocated PDSCH resource for the ACK/NACK is signaled using Radio Resource Control (RRC) signaling.

15. The method of claim 13, wherein the allocated PDSCH resource for the ACK/NACK is specified using a lowest control channel element (CCE) on the control channel and an indicator of the second communication carrier.

16. The method of claim 1, wherein the offset of the third time interval is dynamically signaled within the PDCCH.

17. The method of claim 16, wherein the offset of the third time interval is dynamically signaled using a downlink control information (DCI) message transmitted over the PDCCH.

18. The method of claim 16, wherein the offset of the third time interval is dynamically signaled using a resource location of a data control information (DCI) transmission within the PDCCH.

19. The method of claim 1, wherein the resource information allocates a plurality of PDCCH resources on the second communication carrier, each of the plurality of PDCCH resources being allocated at different subframes on the second communication carrier.

20. A user agent (UA) configured to communicate with a wireless communications network using a first and second communication carrier, comprising:
a processor, the processor being configured to:
receive, from an eNB, resource information on a physical downlink control channel (PDCCH) during a first time interval, the resource information allocating a physical downlink shared channel (PDSCH) resource on at least one of the first communication carrier or the second communication carrier, wherein the first time interval is a first subframe on the first communication carrier;

when the resource information allocates a PDSCH resource on the first communication carrier, receive data using the first communication carrier during a second time interval, wherein the second time interval is a second subframe on the first communication carrier; and when the resource information allocates a PDSCH resource on the second communication carrier, determine a third time interval by adding a predetermined subframe offset to the first time interval and receive data using the second communication carrier during the third time interval, wherein the third time interval is a third subframe on the second communication carrier, the third time interval being different from and subsequent to the first time interval, wherein the third subframe is offset from the first subframe on the first communication carrier by one of 1, 2, 3, or 4 subframes.

21. The UA of claim 20, wherein the resource information is received using the first communication carrier.

22. The UA of claim 20, wherein the offset of the third time interval from the first time interval is configured using Radio Resource Control (RRC) messages.

23. The UA of claim 20, wherein the offset of the third time interval from the first time interval is approximately 4 milliseconds (4 ms).

24. The UA of claim 20, wherein, when the resource information allocates a PDSCH resource on a third communication carrier, the processor is configured to receive data using the third communication carrier during a fourth time interval.

25. The UA of claim 20, wherein:
when the resource information allocates a PDSCH resource on the first communication carrier, the processor is configured to transmit at least one of an acknowledgement or a non-acknowledgement (ACK/NACK) message using a first ACK/NACK resource; and
when the resource information allocates a PDSCH resource on the second communication carrier, the processor is configured to transmit an ACK/NACK message using a second ACK/NACK resource.

26. A wireless communications system for allocating resources on at least one of a first and second communication carrier of the wireless communications system to a user agent (UA), comprising:
a base station, the base station being configured to:
transmit, to the UA, resource information on a physical downlink control channel (PDCCH) during a first time interval, the resource information allocating a physical downlink shared channel (PDSCH) resource on at least one of the first communication carrier or the second communication carrier, wherein the first time interval is a first subframe on the first communication carrier;
when the resource information allocates a PDSCH resource on the first communication carrier, transmit data using the first communication carrier during a second time interval, wherein the second time interval is a second subframe on the first communication carrier; and
when the resource information allocates a PDSCH resource on the second communication carrier, determining a third time interval by adding a predetermined subframe offset to the first time interval and transmit data using the second communication carrier during the third time interval, wherein the third time interval is a third subframe on the second communication carrier, the third time interval being different from and subsequent to the first time interval, wherein the third subframe is offset from the first subframe on the first communication carrier by one of 1, 2, 3, or 4 subframes.

27. The wireless communications system of claim 26, wherein the resource information is received using the first communication carrier.

28. The wireless communications system of claim 26, wherein the offset of the third time interval from the first time interval is configured using Radio Resource Control (RRC) messages.

29. The wireless communications system of claim 26, wherein the offset of the third time interval from the first time interval is approximately 4 milliseconds (4 ms).

30. The wireless communications system of claim 26, including, when the resource information allocates a PDSCH resource on a third communication carrier, the base station is configured to transmit data using the third communication carrier during a fourth time interval.

31. A wireless communications system for allocating resources on at least one of a first and second communication carrier of the wireless communications system to a user agent (UA), comprising:
a first base station providing the first communication carrier, the first base station being configured to:
transmit, to the UA, resource information on a physical downlink control channel (PDCCH) during a first time interval, the resource information allocating a physical downlink shared channel (PDSCH) resource on at least one of the first communication carrier or the second communication carrier, and
when the resource information allocates a PDSCH resource on the first communication carrier, transmit data using the first communication carrier during the first time interval wherein the first time interval is a first subframe on the first communication carrier; and
a second base station providing the second communication carrier and being configured to, when the resource information allocates a PDSCH resource on the second communication carrier, determining a second time interval by adding a predetermined subframe offset to the first time interval and transmit data using the second communication carrier during the second time interval, wherein the second time interval is a second subframe on the first communication carrier the second time interval being different from and subsequent to the first time interval, wherein the second subframe is offset from the first subframe by one of 1, 2, 3, or 4 subframes.

* * * * *

UNITED STATES PATENT AND TRADEMARK OFFICE
CERTIFICATE OF CORRECTION

| | | |
|---|---|---|
| PATENT NO. | : 8,848,623 B2 | Page 1 of 1 |
| APPLICATION NO. | : 12/545684 | |
| DATED | : September 30, 2014 | |
| INVENTOR(S) | : Cai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 760 days.

Signed and Sealed this
Twenty-second Day of September, 2015

Michelle K. Lee
*Director of the United States Patent and Trademark Office*